A. W. BROWNE.
Mechanical Movement.

No. 94,068. Patented Aug. 24, 1869.

Witnesses
L. Harler
Phil. T. Dodge

Inventor
A. W. Brown
By Dodge munn
his attys

United States Patent Office.

A. W. BROWNE, OF BROOKLYN, NEW YORK, ASSIGNOR TO HIMSELF AND THE NEW YORK TOY MANUFACTURING COMPANY.

Letters Patent No. 94,068, dated August 24, 1869.

IMPROVED MECHANICAL MOVEMENT.

The Schedule referred to in these Letters Patent and making part of the same.

*To all whom it may concern:*

Be it known that I, A. W. BROWNE, of Brooklyn, in the county of Kings, and State of New York, have invented certain new and useful Improvements in Mechanical Movements; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists of a novel arrangement of mechanism, whereby I produce a mechanical movement that may be used for a great variety of purposes, and that is specially adapted to the operating of toys.

Figure 1:
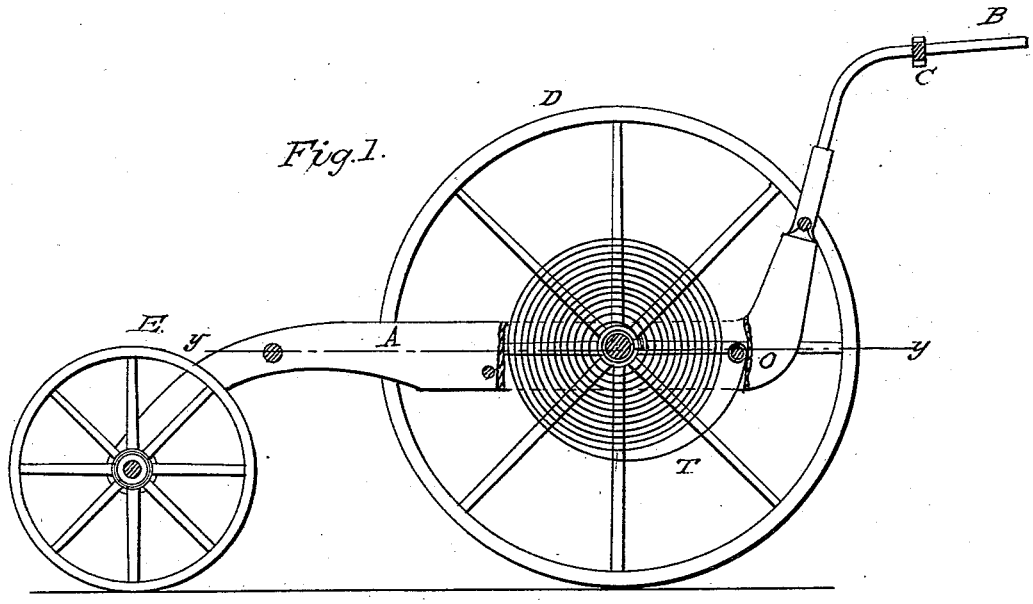

Figure 1 is a side elevation, and

Figure 2:
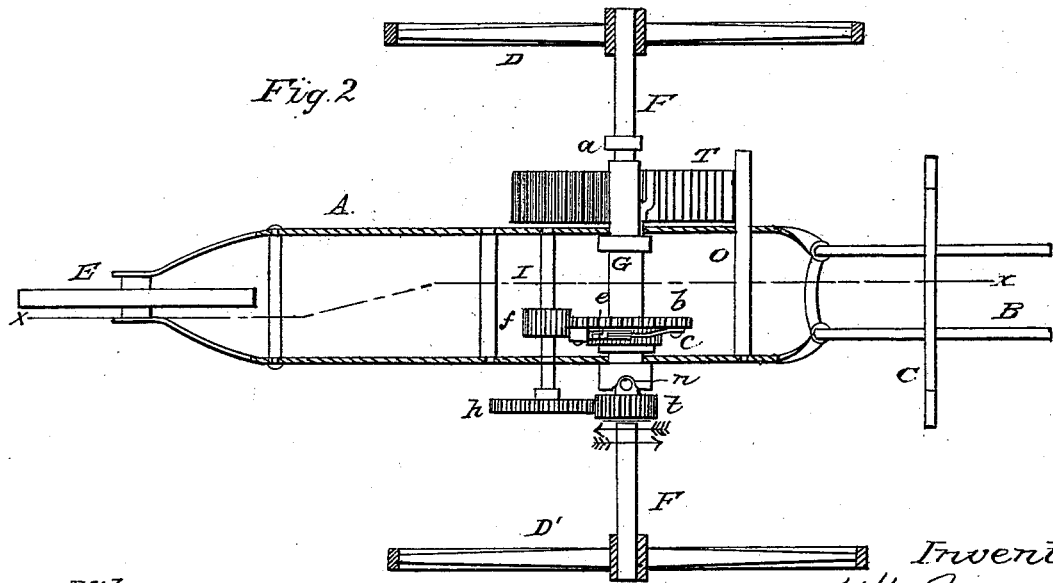

Figure 2, a top plan view of my apparatus, applied to a toy-carriage, the frame being shown in section in both views, for the purpose of more clearly exhibiting the mechanism.

The frame A may be made in any desired form or shape, it being represented in this case as the frame of a child's carriage.

In the frame A, whatever its form may be, I mount a tubular shaft, G, to one end of which, outside of the frame A, I attach one end of a spiral spring, T, the other end of said spring being connected to the frame by means of a rod, or in any other suitable manner, the object of placing the spring outside of the frame being to enable the spring to be detached and replaced without separating or taking apart the mechanism or frame.

Upon this tubular shaft G, I secure a wheel, b, loosely, said wheel carrying a pawl, e, that engages with the teeth of a ratchet-wheel, c, that is fixed rigidly on said shaft G.

This wheel b engages in a pinion, f, secured rigidly on a countershaft, I, which latter also carries on its end, outside of the frame, a wheel, h, which latter gears into a pinion, t, secured rigidly on an axle or shaft, F, that passes through the tubular shaft G, as shown in fig. 2.

This shaft or axle F has a pin, n, inserted through it, between the pinion t and the end of the tubular shaft G, which pin engages in notches cut in the end of said tubular shaft, when the shaft F is shoved over, as shown in fig. 2, the pin and notch thus forming a clutch to lock the two shafts G and F together.

The shaft F is arranged to slide longitudinally on the shaft G, far enough to throw the clutch in or out of gear, whenever desired, and the shaft F has a collar, a, on the opposite side, to prevent it from moving any further than is necessary to release the clutch.

The notch in the end of the tubular shaft G is made with its shoulders inclined on one side, and straight on the opposite side, so that when the pin is pushed into the notch, and the axle or shaft F is turned in the direction indicated by the black arrow, the pin n, engaging against the straight shoulders, locks the shaft G to F, and causes them to turn together; but, when released, and the spring operates the mechanism, the pin will slide up the inclined shoulders, and thus disconnect the shafts F and G, permitting each to revolve separately.

By this arrangement of the mechanism, I am enabled to produce a very compact device, that will run for considerable time, and that can be wound up without the use of a key, it only being necessary to hold the frame with one hand, and shoving the axle F over, so as to shove the pin n into the notch, turn the axle F in the direction indicated by the black arrow.

When released, and operated by the spring, the shaft or axle F will be rotated in the direction indicated by the red arrow.

Having thus described my invention,

What I claim, is—

1. The mechanical movement, constructed substantially as herein described.

2. The combination of the tubular shaft G, and the axle or shaft F, when arranged to clutch together for the purpose of winding up the spring, substantially as described.

A. W. BROWNE.

Witnesses:
H. B. BROWN,
JAS. L. CLARK.